US010339812B2

(12) United States Patent
Tamer et al.

(10) Patent No.: US 10,339,812 B2
(45) Date of Patent: Jul. 2, 2019

(54) SURROUNDING VIEW CAMERA BLOCKAGE DETECTION

(71) Applicants: Denso International America, Inc., Southfield, MI (US); DENSO CORPORATION, Kariya, Aichi-pref. (JP)

(72) Inventors: Malok Alamir Tamer, Troy, MI (US); Kenji Okano, Kariya (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 72 days.

(21) Appl. No.: 15/448,287

(22) Filed: Mar. 2, 2017

(65) Prior Publication Data
US 2018/0253630 A1 Sep. 6, 2018

(51) Int. Cl.
*G08G 1/16* (2006.01)
*G06T 11/60* (2006.01)
(Continued)

(52) U.S. Cl.
CPC ......... *G08G 1/167* (2013.01); *G06K 9/00805* (2013.01); *G06T 7/248* (2017.01); *G06T 11/60* (2013.01); *H04N 5/217* (2013.01); *H04N 5/228* (2013.01); *H04N 5/232* (2013.01); *H04N 5/235* (2013.01); *H04N 5/247* (2013.01); *H04N 7/181* (2013.01); *G06T 2207/30241* (2013.01)

(58) Field of Classification Search
CPC .... H04N 5/2171; H04N 5/2173; H04N 5/228; H04N 5/235; H04N 5/232
See application file for complete search history.

(56) References Cited

U.S. PATENT DOCUMENTS

| 4,574,393 A | 3/1986 | Blackwell et al. |
| 6,792,161 B1 | 9/2004 | Imaizumi et al. |

(Continued)

FOREIGN PATENT DOCUMENTS

| WO | WO-2010038223 A1 | 4/2010 |
| WO | WO-2015011998 A1 | 1/2015 |
| WO | WO-2015125590 A1 | 8/2015 |

*Primary Examiner* — Joshua D Taylor
(74) *Attorney, Agent, or Firm* — Harness, Dickey & Pierce, P.L.C.

(57) ABSTRACT

A camera monitoring system for a vehicle includes a plurality of cameras disposed around an exterior of a vehicle. An image processing module communicates with the plurality of cameras, generating overhead view images from raw images taken by at least one of the plurality of cameras. A histogram module communicates with the image processing module, generating at least one histogram from the overhead view images. A likelihood module communicates with the histogram module and determines a likelihood of blockage for at least one of the plurality of cameras. A line alignment module communicates with the likelihood module and the image processing module to determine whether a trajectory of detected feature points in a selected camera aligns with a trajectory of detected feature points in an adjacent camera. A reporting module communicates with the line alignment module and reports a camera blockage status to at least one vehicle system or controller.

18 Claims, 12 Drawing Sheets

(51) Int. Cl.
*G06T 7/246* (2017.01)
*H04N 5/247* (2006.01)
*H04N 5/235* (2006.01)
*H04N 5/232* (2006.01)
*H04N 5/228* (2006.01)
*H04N 7/18* (2006.01)
*G06K 9/00* (2006.01)
*H04N 5/217* (2011.01)

(56) References Cited

U.S. PATENT DOCUMENTS

| | | | |
|---|---|---|---|
| 7,463,145 | B2 | 12/2008 | Jentoft |
| 7,619,668 | B2 | 11/2009 | Saka et al. |
| 8,243,166 | B2 | 8/2012 | Kumar et al. |
| 8,553,088 | B2 | 10/2013 | Stein et al. |
| 9,064,317 | B2 | 6/2015 | Liu et al. |
| 9,253,375 | B2 | 2/2016 | Milanfar et al. |
| 2001/0002936 | A1 | 6/2001 | Tsuji et al. |
| 2003/0103649 | A1 | 6/2003 | Shimakage |
| 2006/0115121 | A1 | 6/2006 | Saka et al. |
| 2006/0119472 | A1 | 6/2006 | Tsuboi |
| 2007/0115352 | A1* | 5/2007 | Oskiper ............... H04N 5/232 348/44 |
| 2007/0263902 | A1 | 11/2007 | Higuchi et al. |
| 2008/0002907 | A1 | 1/2008 | Xu et al. |
| 2008/0167041 | A1* | 7/2008 | Wang ............... H04W 36/30 455/436 |
| 2008/0195315 | A1* | 8/2008 | Hu ............... G01C 21/3647 701/455 |
| 2009/0096896 | A1* | 4/2009 | Imafuji ............... H04N 5/235 348/234 |
| 2011/0080494 | A1 | 4/2011 | Mori et al. |
| 2011/0187886 | A1* | 8/2011 | Nakajima ............... H04N 5/228 348/222.1 |
| 2013/0120578 | A1* | 5/2013 | Iga ............... B60R 1/00 348/148 |
| 2013/0300869 | A1 | 11/2013 | Lu et al. |
| 2014/0009615 | A1 | 1/2014 | Kiyohara et al. |
| 2014/0009617 | A1 | 1/2014 | Utagawa et al. |
| 2014/0009618 | A1 | 1/2014 | Imai et al. |
| 2014/0010408 | A1 | 1/2014 | Irie et al. |
| 2014/0232869 | A1 | 8/2014 | May et al. |
| 2014/0293079 | A1* | 10/2014 | Milanfar ............... H04N 5/2171 348/222.1 |
| 2014/0307129 | A1* | 10/2014 | Feng ............... H04N 5/2173 348/242 |
| 2015/0015384 | A1 | 1/2015 | Shima et al. |
| 2015/0302257 | A1 | 10/2015 | Takemura et al. |
| 2015/0323785 | A1 | 11/2015 | Fukata et al. |
| 2015/0334385 | A1 | 11/2015 | Takemura et al. |
| 2016/0073090 | A1 | 3/2016 | Love et al. |
| 2016/0165101 | A1 | 6/2016 | Akiyama et al. |
| 2016/0364620 | A1 | 12/2016 | Akiyama et al. |
| 2018/0075741 | A1* | 3/2018 | Bidner ............... G01S 13/931 |

* cited by examiner

SURROUNDING VIEW CAMERA BLOCKAGE DETECTION

FIELD

The present disclosure relates to systems and methods for detecting blockages in a vehicle's surrounding view cameras.

BACKGROUND

This section provides background information related to the present disclosure which is not necessarily prior art.

A variety of vehicle systems use vision-based data from cameras on the vehicle's exterior. Examples of these systems are back-up cameras, systems for detecting the presence of surrounding objects such as other vehicles or pedestrians, systems for detecting the lane markers, automated driving systems, etc. The quality of the images provided by the cameras may affect the accuracy of the data provided by the system. Problems such as obstructions from the environment (mud, rain, dirt, etc) or other obstructions (paint, tape, etc.) can cause partial or total blockage of the camera's view. In these instances, the information from the camera is compromised and may be unreliable for the vehicle system.

SUMMARY

This section provides a general summary of the disclosure, and is not a comprehensive disclosure of its full scope or all of its features.

An example camera monitoring system for a vehicle includes a plurality of cameras disposed around an exterior of a vehicle. An image processing module communicates with the plurality of cameras and generates overhead view images from raw images taken by at least one of the plurality of cameras. A histogram module communicates with the image processing module and generates at least one histogram from the overhead view images. A likelihood module communicates with the histogram module and determines a likelihood of blockage for at least one of the plurality of cameras. A line alignment module communicates with the likelihood module and the image processing module to determine whether a trajectory of detected feature points in a selected camera of the plurality of cameras aligns with a trajectory of detected feature points in an adjacent camera of the plurality of cameras. A reporting module communicates with the line alignment module and reports a camera blockage status to at least one vehicle system or controller.

The camera monitoring system may further include a front camera mounted on a front of the vehicle, a rear camera mounted on a back of the vehicle, a left side camera mounted on a left side of the vehicle, and a right side camera mounted on a right side of the vehicle.

The camera monitoring system may further include a histogram module that converts a plurality of pixels of the raw images from color pixels into gray tone values representing a luminosity based on a weighted average of red, green, and blue colors in each pixel.

The camera monitoring system may further include a histogram module that converts a plurality of pixels of the raw images into 8-bit luminance values, each luminance value being within a range of 0 and 255.

The camera monitoring system may further include a histogram module that maps the luminance values to create a luminance histogram.

The camera monitoring system may further include a plurality of pixels in the luminance histogram that are from a region of interest within at least one of the overhead view images.

The camera monitoring system may further include a likelihood module that determines a blackout ratio and a whiteout ratio for the at least one histogram.

The camera monitoring system may further include a blackout ratio that is the total pixels within a range of 0 to 40 on the at least one histogram divided by the total pixel count, and a whiteout ratio that is the total pixels within a range of 250 to 255 on the at least one histogram divided by the total pixel count.

The camera monitoring system may further include a likelihood module that sums the blackout ratio and the whiteout ratio to create a Blackout+Whiteout ratio and that determines whether the Blackout+Whiteout ratio is greater than a first predetermined threshold, indicating a possible blockage of at least one of the plurality of cameras.

The camera monitoring system may further include a first predetermined threshold that is 0.3.

The camera monitoring system may further include a line alignment module that determines a moving average of the trajectory of detected feature points in the selected camera of the plurality of cameras from the trajectory of detected feature points in the adjacent camera of the plurality of cameras and that determines whether the moving average is less than a second predetermined threshold, indicating a blocked camera.

The camera monitoring system may further include a second predetermined threshold that is 0.5.

The camera monitoring system may further include a reporting module that retains the camera blockage status for a predetermined buffer period before reporting the camera blockage status to ensure the validity of results.

The camera monitoring system may further include a predetermined buffer period that is at least 50 frames or at least 100 meters driving distance.

An example method for detecting blockages in a vehicle's surrounding view cameras includes capturing, by a plurality of cameras disposed around an exterior of a vehicle, raw images of the vehicle's surroundings; generating, by an image processing module, overhead view images from the raw images taken by at least one of the plurality of cameras; generating, by a histogram module, at least one histogram from the overhead view images; determining, by a likelihood module, a likelihood of blockage for at least one of the plurality of cameras; determining, by a line alignment module, whether a trajectory of detected feature points in a selected camera of the plurality of cameras aligns with a trajectory of detected feature points in an adjacent camera of the plurality of cameras; and reporting, by a reporting module, a camera blockage status to at least one vehicle system or controller.

The method may further comprise converting a plurality of pixels of the raw images from color pixels into gray tone values representing a luminosity based on a weighted average of red, green, and blue colors in each pixel to generate the at least one histogram.

The method may further comprise mapping a plurality of pixels from a region of interest within at least one of the overhead view images to generate the at least one histogram.

The method may further comprise determining a blackout ratio and a whiteout ratio for the at least one histogram; summing the blackout ratio and the whiteout ratio to create a Blackout+Whiteout ratio; and determining whether the Blackout+Whiteout ratio is greater than a first predetermined threshold, indicating a possible blockage of at least one of the plurality of cameras, wherein the first predetermined threshold is 0.3.

The method may further comprise determining a moving average of the trajectory of detected feature points in the selected camera of the plurality of cameras from the trajectory of detected feature points in the adjacent camera of the plurality of cameras, and determining whether the moving average is less than a second predetermined threshold, indicating a blocked camera, wherein the second predetermined threshold is 0.5.

The method may further comprise retaining the camera blockage status for a predetermined buffer period before reporting the camera blockage status to ensure the validity of results, wherein the predetermined buffer period is at least 50 frames or at least 100 meters driving distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout he several views of the drawings.

DETAILED DESCRIPTION

Figure 1A:
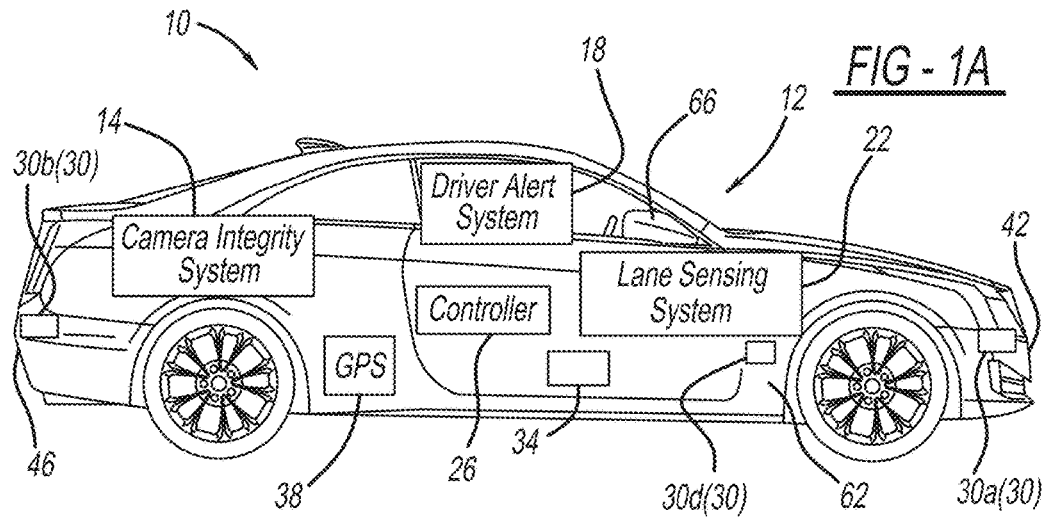
FIG. 1A illustrates a subject vehicle including a camera monitoring system according to the present teachings for monitoring integrity of images produced by cameras on the subject vehicle.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms, These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A variety of systems within a vehicle utilize data from externally mounted cameras viewing the surrounding environment of the vehicle. For example, a vehicle's Video-Processing Module's (VPM) vision-based lane sensing feature utilizes lane marker detection information. The lane marker detection information is estimated using overhead images consisting of four camera images to provide accurate heading and offset information for the vehicle's systems such as the cruise control system, for example. The quality of the captured images has a significant effect on the accuracy of the sensing information, and, thus, the overall system's performance. Therefore, a system and method for detecting both partial and full blockages of the vehicle's cameras provides a much needed improvement to the lane sensing system by providing information relating to the integrity of the camera such that the lane sensing system can make appropriate adjustments in the confidence value applied to the camera information.

Referring to FIG. 1A, a vehicle 10 having a camera monitoring system 12 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. The vehicle 10 may further be a self-driving vehicle. The system 12 is configured to inform various vehicle systems, and in particular, a lane sensing system 22 that one or more cameras on the vehicle is obstructed, either completely or partially. The system 12 generally includes a camera integrity system 14, a driver alert system 18, the lane sensing system 22, a controller 26, and a number of cameras 30 mounted or attached to the exterior of the vehicle 10. For example, the vehicle of the embodiment illustrated in FIGS. 1A and 1B includes four cameras 30, a front camera 30a, a rear camera 30b, a left side camera 30c, and a right side camera 30d.

The vehicle 10 also includes vehicle sensors 34 and a global positioning system (GPS) 38. The GPS 38 determines the location and inertial/orientation data of the vehicle 10. Additionally, or alternatively, an image navigation system may be used in addition to or in place of the GPS 26. The image navigation system, for example, may determine a location of the vehicle 10 based on image data collected from the cameras 34, Lidar sensors, stereo sensors, radar sensors, ultrasonic sensors, or other sensors on the vehicle 10. The vehicle sensors 34 can also include a vehicle speed sensor that generates data indicating a current speed of the vehicle 10, a vehicle acceleration sensor that generates data indicating a current rate of acceleration or deceleration of the vehicle 10, a steering wheel angle or position sensor indicating a current angle of the steering wheel, or any other sensor providing vehicle data to any of the driver alert system 18, lane sensing system 22, controller 26, and camera integrity system 14. The vehicle sensors 34 can also include environmental sensors such as sensors to determine light level, weather data, temperature, road surface status, traffic conditions, lane markers, etc. The controller 26 receives data from the sensors 34 and GPS 38 and uses the data for controlling the various vehicle systems.

The controller 26 can be any suitable controller for monitoring or controlling one or more of the sensors 34, the driver alert system 18, the camera integrity system 14, the GPS 38, the cameras 30, and/or the lane sensing system 22. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

Figure 1B:
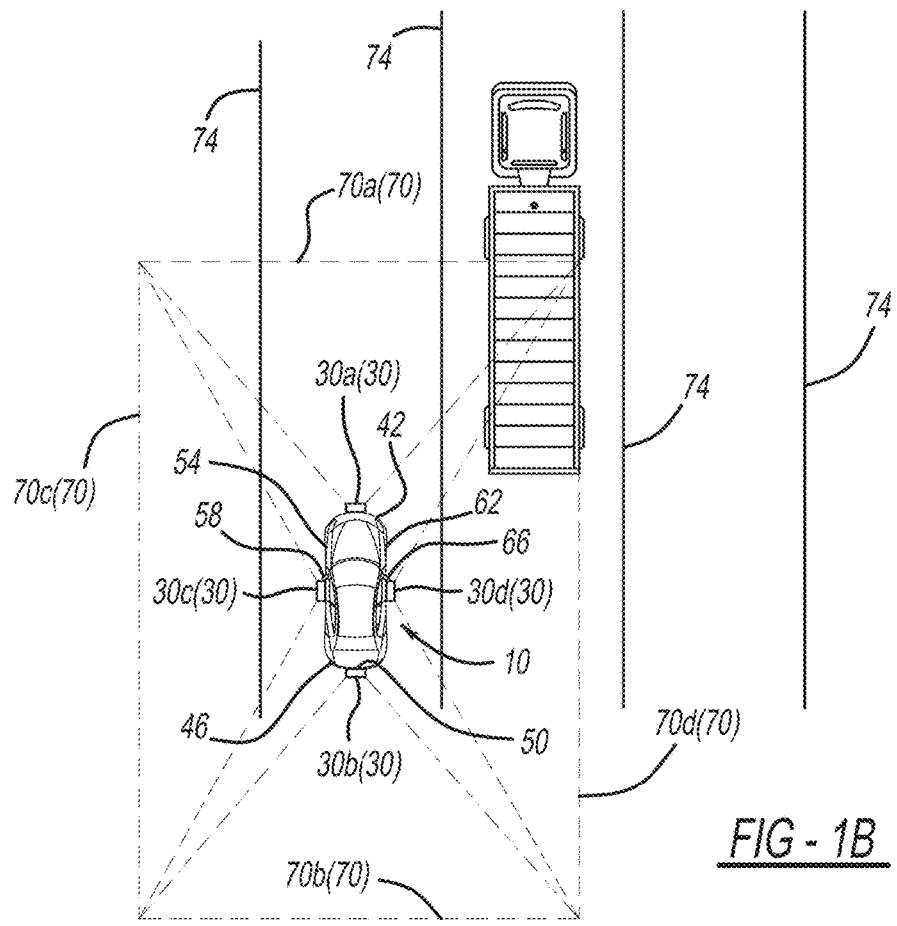
FIG. 1B illustrates the subject vehicle, a secondary vehicle, and lane markers according to the present teachings.

Now referring additionally to FIG. 1B, the front camera 30a may be positioned near a front bumper 42 of the vehicle 10 or in any other location on the front of the vehicle 10 where the front camera 30a provides an image of objects and/or lane markers in front of the vehicle 10. The rear camera 30b may be positioned near a rear bumper 46 or rear license plate 50 of the vehicle 10 or in any other location on the back of the vehicle 10 where the rear camera 30b provides an image of objects and/or lane markers behind the vehicle 10. The left side camera 30c may be positioned near a front left fender 54 or a left side mirror 58 of the vehicle 10 or in any other location on the left side of the vehicle where the left side camera 30c provides an image of objects and/or lane markers to the left of the vehicle 10. The right side camera 30d may be positioned near a front right fender 62 or a right side mirror 66 of the vehicle 10 or in any other location on the right side of the vehicle where the right side camera 30d provides an image of objects and/or lane markers to the right of the vehicle 10.

The cameras 30 may be positioned on the vehicle such that a field of vision 70 of each camera 30 covers at least the side of the vehicle 10 on which the camera 30 is mounted. Additionally, the fields of vision 70 for the cameras 30 may overlap with each other. For example, the field of vision 70a for the front camera 30a may provide an image of the environment in front of the vehicle 10 and may overlap with the field of vision 70c for the left side camera 30c and the field of vision 70d for the right side camera 30d. The field of vision 70b for the rear camera 30b may provide an image of the environment behind the vehicle 10 and may overlap with the field of vision 70c for the left side camera 30c and the field of vision 70d for the right side camera 30d. The field of vision 70c for the left side camera 30c may provide an image of the environment on the left side of the vehicle 10 and may overlap with the field of vision 70a for the front camera 30a and the field of vision 70b for the rear camera 30b. The field of vision 70d for the right side camera 30d may provide an image of the environment on the right side of the vehicle 10 and may overlap with the field of vision 70a for the front camera 30a and the field of vision 70b for the rear camera 30b.

Each field of vision 70 for each camera 30 may include an image having lane markers, or lane identifiers, 74. The lane sensing system 22 utilizes the images from the cameras 30 to determine the position of the vehicle 10 within the lane markers 74. The lane sensing system 22 also utilizes sensor 34 information to determine, for example, whether a turn signal is activated, indicating a desired lane change, or whether the steering wheel is at an angle. If the vehicle is within a threshold (for example only, within 8 inches) of the lane marker 74, the lane sensing system 22 may alert the driver through the driver alert system 18 or may correct the vehicle's path through the controller 26. For example only, the lane sensing system 22 may alert the driver with an audible or visual alarm, or the lane sensing system 22 may correct the vehicle's path by autonomously turning the steering wheel.

Figure 2B:
FIGS. 2A-2D illustrate example raw images from cameras on the subject vehicle and provide example fields of vision for the cameras according to the present teachings.
Figure 2D:
Figure 2A:
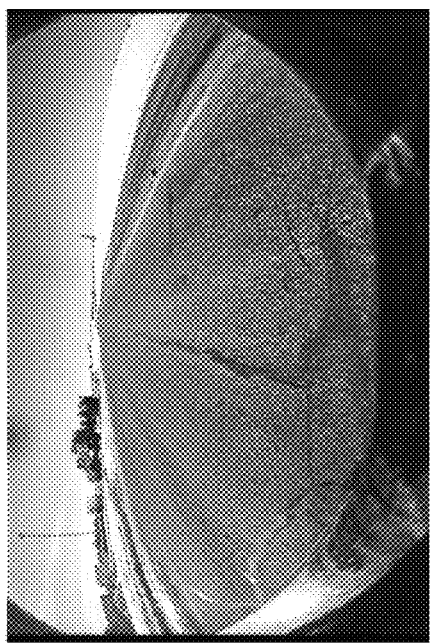
Figure 2C:
Figure 3:
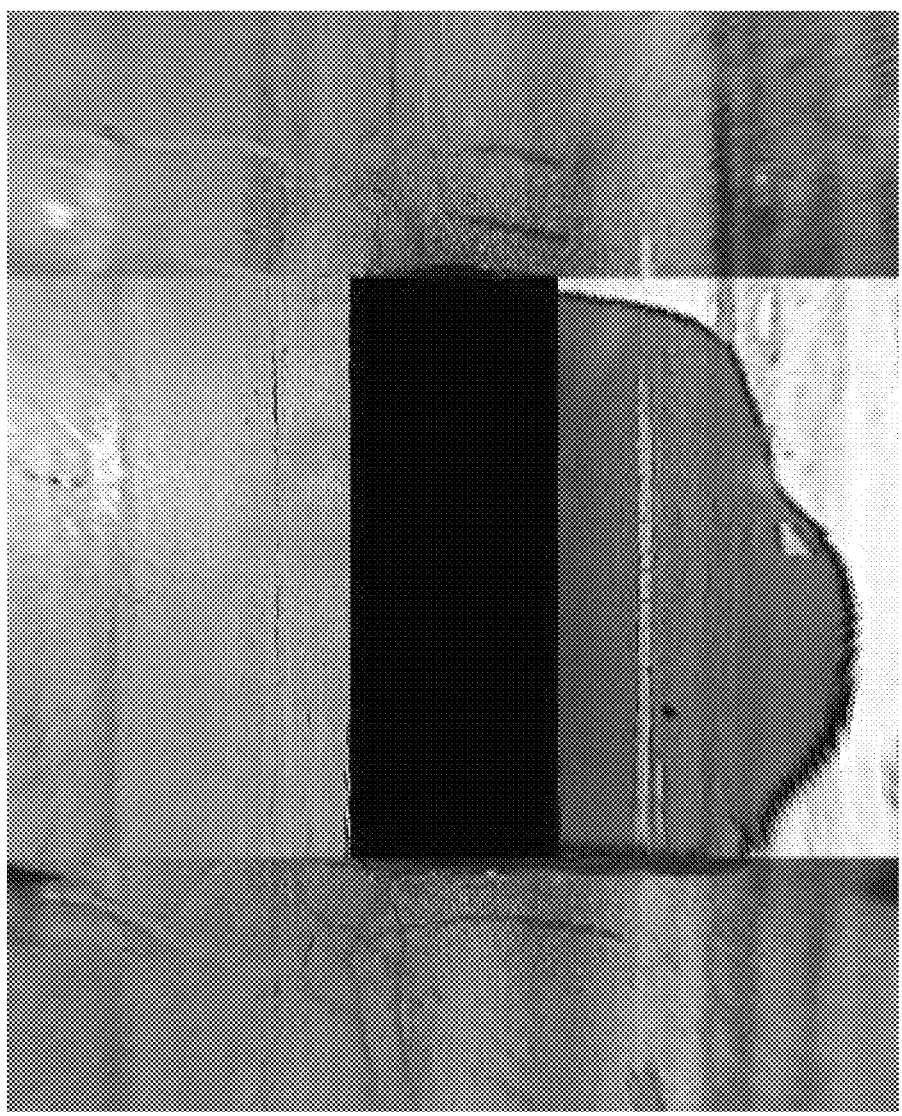
FIG. 3 illustrates an example overhead view image created from the raw images in FIGS. 2A-2D according to the present teachings.

Examples of the fields of vision 70 for the cameras 30 are shown in FIGS. 2A-2D. FIGS. 2A-2D illustrate views of the front camera 30a (FIG. 2A), the rear camera 30b (FIG. 2B), the left side camera 30c (FIG. 2C), and the right side camera 30d (FIG. 2D) under normal, unobstructed conditions. As illustrated in FIGS. 2A-2D, the cameras 30 are able to capture images including surrounding objects and lane markers 74. The vehicle's shadow is also clearly seen in the right side camera image (FIG. 2D). As previously stated and described in detail later, the images from the cameras 30 are combined by the camera integrity system 14 into a single overhead view (OHV) image 78, shown in FIG. 3.

Often, due to environmental conditions, such as weather, mud, water, etc., or other conditions, such as paint, tape, etc., one or more of the cameras 30 may become either partially or totally blocked or the image may be degraded. Example causes of a blocked camera may be an obstacle being attached to a camera lens (for example, tape, mud, dirt, insects, etc), an obstacle obstructing the camera's view (for example, a wall, tree, vehicle, etc.), extreme bad weather conditions (for example, ice, snow, salt, etc.), light obstructing the camera's view (for example, bright lights after passing a tunnel, bridge, etc), etc. In a blocked camera scenario, the camera's field of vision is fully obstructed or not visible. If the system 12 is experiencing at least one blocked camera, the lane sensing system 22 is unable to detect an existing lane marker 74 or is only able to detect a few detected feature points that are not enough to result in detecting the lane marker 74. The blocked camera results in a lane sensing system 22 output of invalid, low confidence, or blocked.

Example causes of a degraded camera may be an obstacle attached to a camera lens (for example, tape, mud, dirt, insects, etc. partially blocking the camera lens), low luminance (for example, night or tunnel driving, etc.), extreme bad weather conditions (for example, water drops, etc), etc. In a degraded camera scenario, the camera's field of vision is partially obstructed or not visual. If the system 12 is experiencing at least one degraded camera, the system performance is very low in terms of line marker detection because there are few feature points, weak feature points, and/or noisy feature point that increase the possibility of false candidate lane markers. The degraded camera results in a lane sensing system 22 output of invalid or low confidence.

Figure 4A:
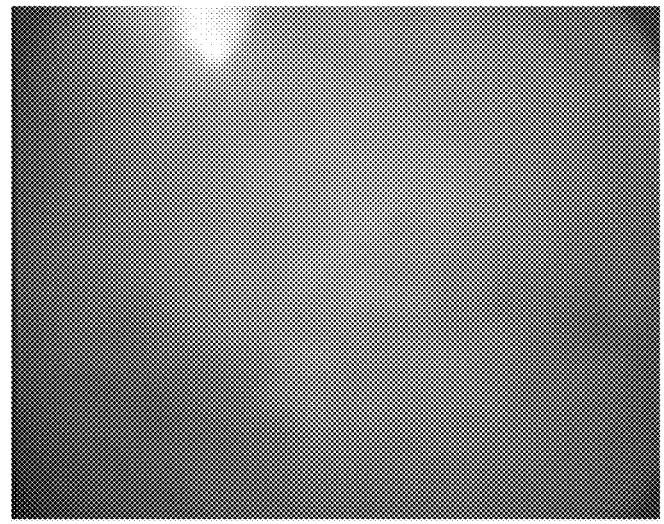
FIG. 4A illustrates an example raw image of a blocked camera according to the present teachings.
Figure 4B:
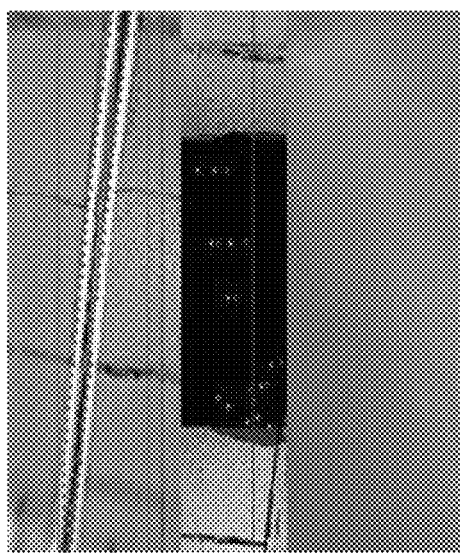
FIGS. 4B and 4C illustrate example front/rear and left/right overhead view images of the raw image in FIG. 4A according to the present teachings.
Figure 4C:
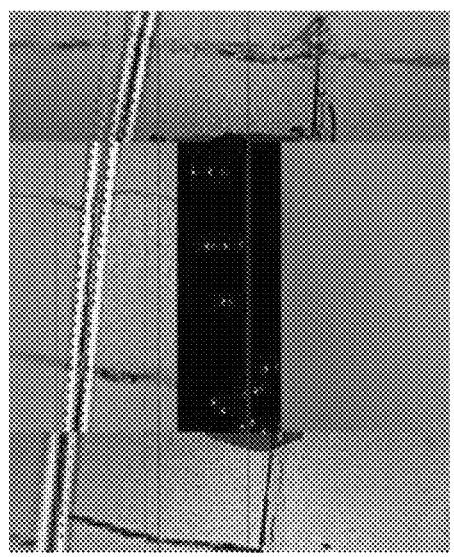

FIGS. 4A-4C and 5A-5C illustrate the raw camera image (FIGS. 4A and 5A) along with the front/rear overhead view image (FIGS. 4C and 5C) and the left right overhead view image (FIGS. 4B and 5B) for examples of a degraded or blocked camera. In FIGS. 4A-4C, the right camera 30d is fully blocked with tape. FIG. 4A illustrates the raw image from the right camera 30d showing no visibility. FIG. 4B is a left/right overhead view image where the overhead view images from the left side camera 30c and the right side camera 30d have been stitched into a single overhead view image. FIG. 4C is a front/rear overhead view image where the overhead view images from the front camera 30a and the rear camera 30b have been stitched into a single overhead view image.

Figure 5A:
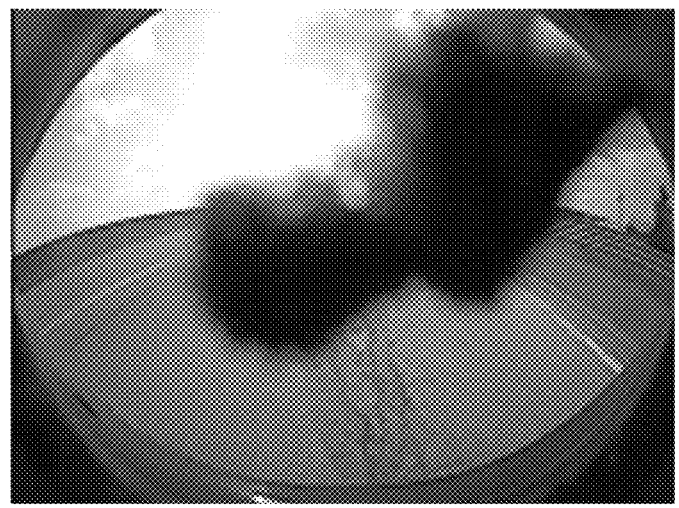
FIG. 5A illustrates an example raw image of a partially blocked or degraded camera according to the present teachings.
Figure 5B:
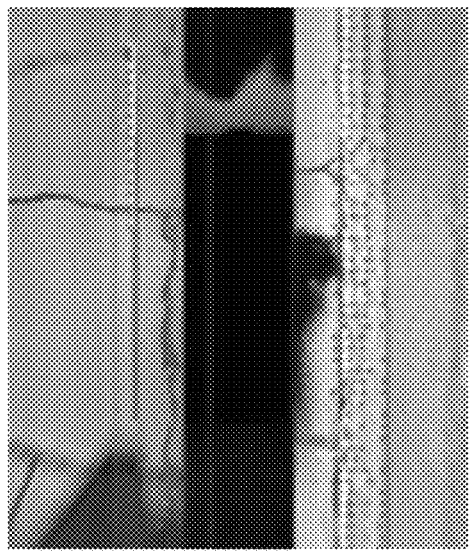
FIGS. 5B and 5C illustrate example front/rear and left/right overhead view images of the raw image in FIG. 5A according to the present teachings.
Figure 5C:
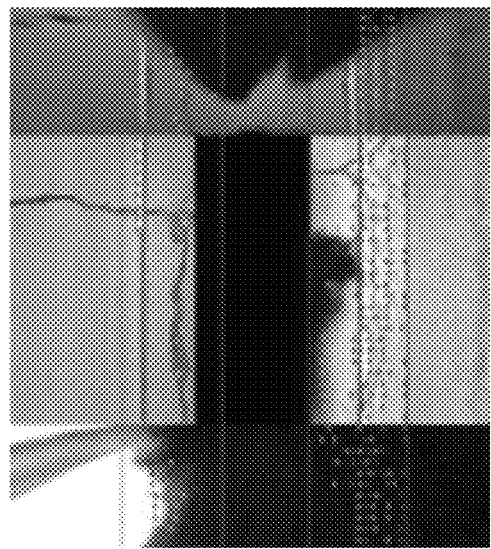

In FIGS. 5A-5C, the front, right, and left cameras are partially blocked with mud. FIG. 5A illustrates the raw image from the front camera 30a showing degraded visibility or a partially blocked image. FIG. 5B is a left/right overhead view image where the overhead view images from the left side camera 30c and the right side camera 30d have been stitched into a single overhead view image. FIG. 5C is a front/rear overhead view image where the overhead view images from the front camera 30a and the rear camera 30b have been stitched into a single overhead view image.

Figure 6:
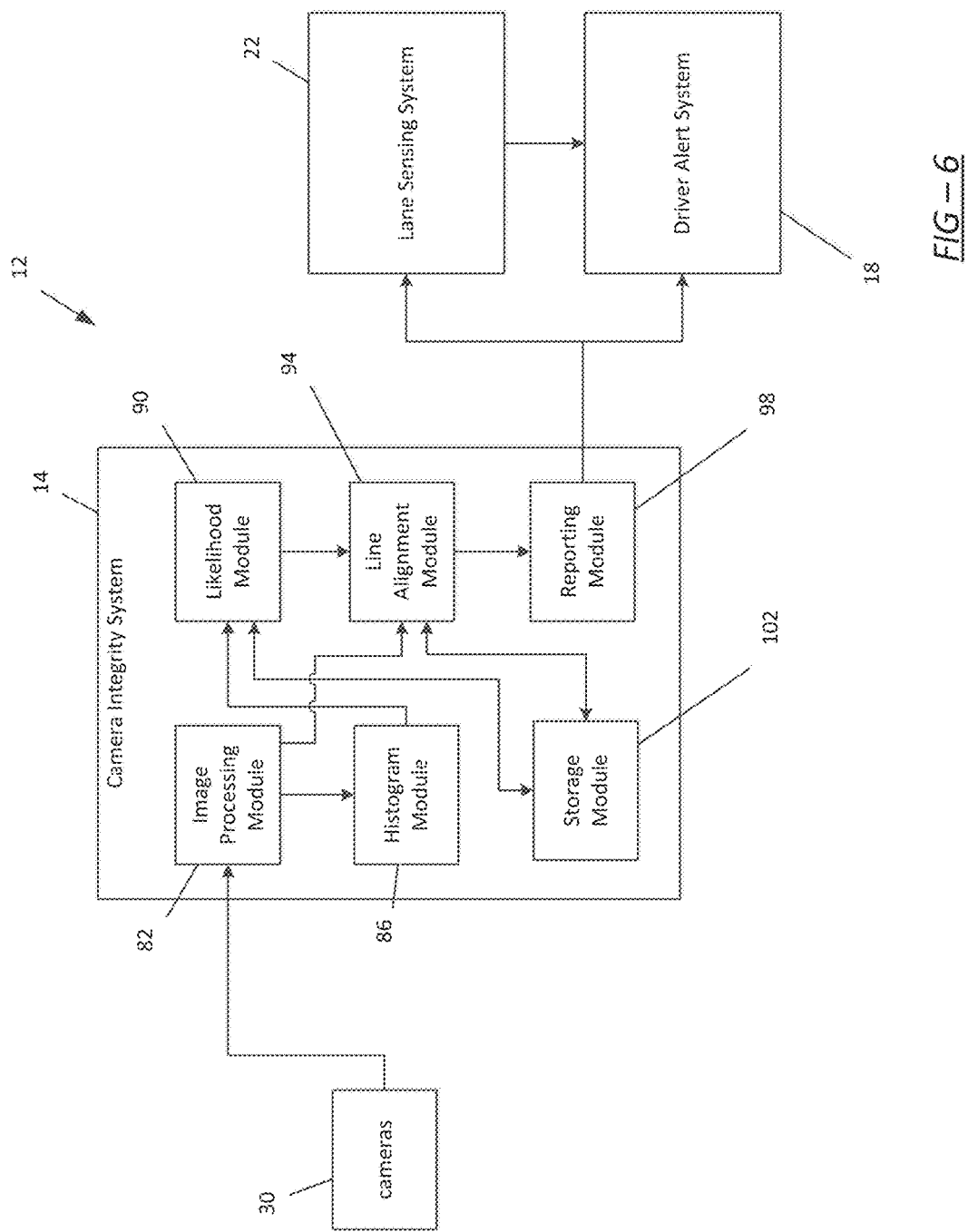
FIG. 6 illustrates a block diagram of a camera monitoring system according to the present teachings for detecting blockages in a vehicle's surrounding view cameras.

Now referring to FIG. 6, an example block diagram of the system 12 is illustrated. The system 12 includes the cameras 30, the camera integrity system 14, the lane sensing system 22, and the driver alert system 18. The cameras 30 communicate with the camera integrity system 14, the camera integrity system 14 communicates with the lane sensing system 22 and the driver alert system 18, and the lane sensing system 22 communicates with the driver alert system 18. The camera integrity system further includes an image processing module 82, a histogram module 86, a likelihood module 90, a line alignment module 94, a reporting module 98, and a storage module 102.

The cameras 30 communicate with the image processing module 82. The cameras 30 send raw images taken from the front camera 30a, the rear camera 30b, the left side camera 30c, and the right side camera 30d (for example, the images in FIGS. 2A-2D) to the image processing module 82 where the images are converted into a single overhead view image (for example, the image in FIG. 3).

The image processing module 82, upon receipt of the raw camera images, converts each raw image into an overhead view image. For example, the raw image from the front camera 30a is converted into a front overhead view image, the raw image from the rear camera 30b is converted into a rear overhead view image, the raw image from the left side camera 30c is converted into a left overhead view image, and the raw image from the right side camera 30d is converted into a right overhead view image. The image processing module 82 then stitches together the front overhead view image and the rear overhead view image to create a front/rear overhead view age (for example, see the images in FIGS. 4C and 5C). The image processing module 82 also stitches together the left overhead view image and the right overhead view image to create a left/right overhead view image (for example, see the images in FIGS. 4B and 5B). The image processing module 82 then stitches together the front/rear overhead view image and the left/right overhead view image to create the single overhead view image (FIG. 3) for the four camera 30 images.

Image stitching is a process of combining multiple images with overlapping fields of view to produce a single image. Image stitching requires substantially similar or exact overlaps between images to produce seamless results. Algorithms combine direct pixel-to-pixel comparisons of the original images to determine distinctive features in each image. The distinctive features are then matched to establish correspondence between pairs of images. The edges of the images are then blended to reduce the visibility of seams between the images.

The image processing module 82 communicates with the histogram module 86 to provide the four individual overhead view images for each camera and the single overhead view image for the four cameras. The histogram module 86 converts the four individual overhead view images to luminance histograms. The histogram module 86 converts the pixels in each of the individual overhead view images from color pixels into gray tone values computed from RGB (red, green, blue) using the following formula:

RGB Luminance Value=0.3R+0.59G+0.11B

Each pixel is converted so that it represents a luminosity based on a weighted average of the three colors, red, green, and blue, at that pixel. While the weighted average of the red, green, and blue colors are 0.3, 0.59, and 0.11 in the equation above, the red, green, and blue colors may be weighted differently as long as the sum of the weights is equal to 1.0. Thus, every RGB pixel computes to an 8-bit luminance value between 0 and 255. The final image of gray tone values appears similar to a grayscale image, but is instead brightness adjusted to indicate appropriately what the human eye sees.

Figure 7A:
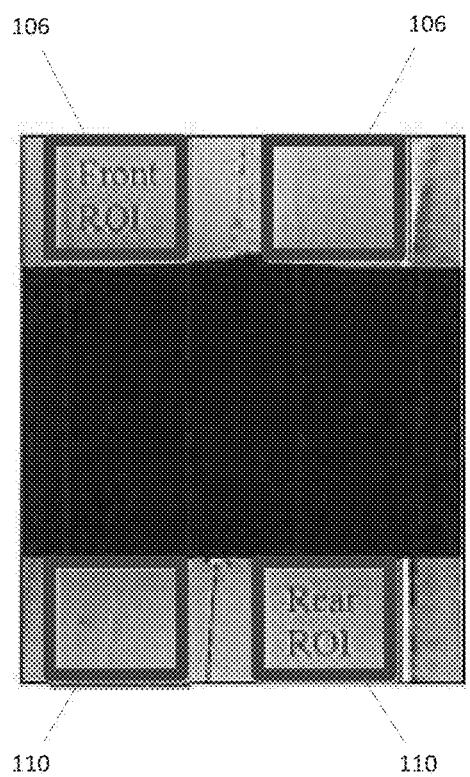
FIGS. 7A and 7B illustrate example regions of interest in example overhead view images according to the present teachings.
Figure 7B:
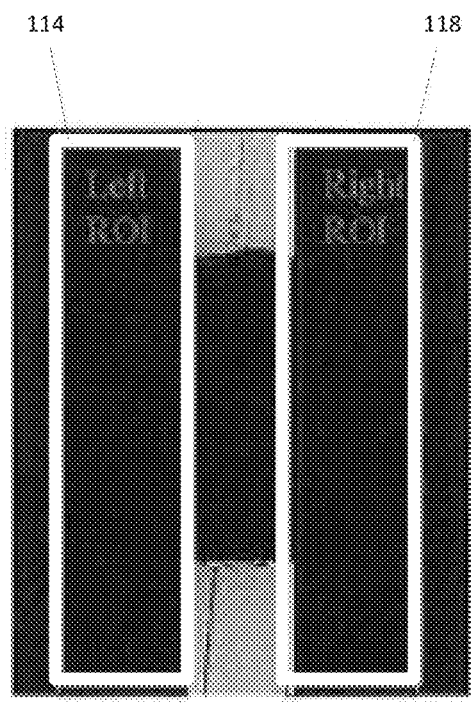

Examples of a front/rear overhead image and a left/right overhead image converted to luminance values are illustrated in FIGS. 7A and 7B. Only the regions of interest (ROI) 106, 110, 114, 118, which are defined as the sub-image of the overhead view image where the lane markers 74 are visible, are considered for the histogram calculations. For example the front ROI 106 and the rear ROI 110 are indicated in FIG. 7A, and the left ROI 114 and the right ROI 118 are indicated in FIG. 7B.

Figure 8A:
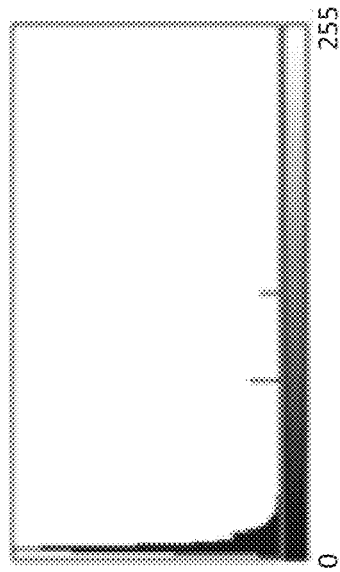
FIGS. 8A-8D illustrate example luminance histograms according to the present teachings.
Figure 8B:
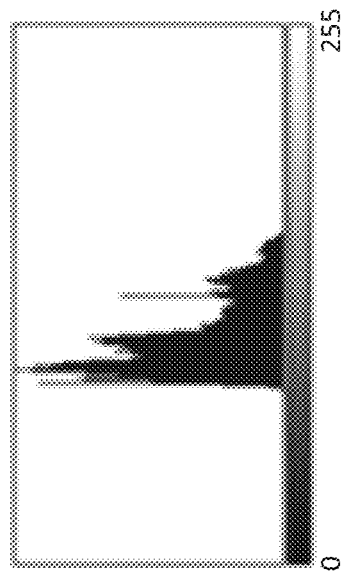
Figure 8C:
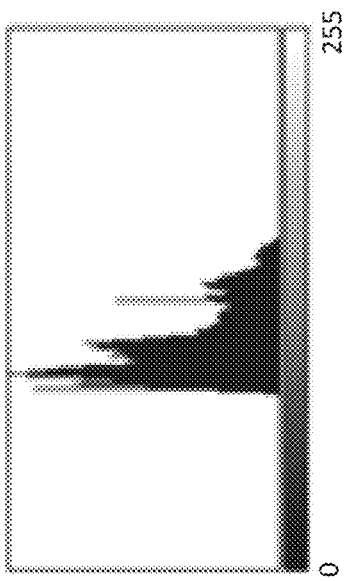
Figure 8D:
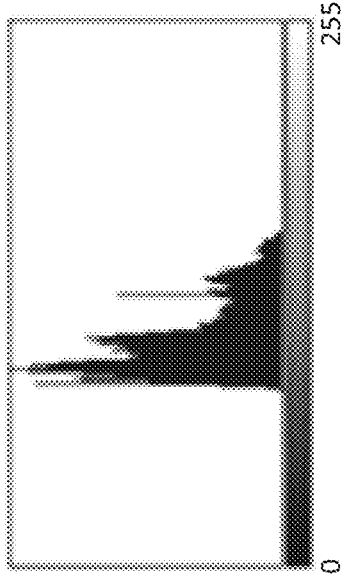

Thus, the histogram module 86, for example, converts the overhead view image from the front camera 30a into luminance values. The histogram module 86 then creates a luminance histogram of the front ROI 106 from the overhead view luminance values image. Likewise, the histogram module 86 converts the overhead view image from the rear camera 30b, the left side camera 30c, and the right side camera 30d into luminance values. The histogram module 86 then creates luminance histograms of the rear ROI 110, the left ROI 114, and the right ROI 118 from the overhead view luminance value images, respectively. An example front luminance histogram is illustrated in FIG. 8A, an example rear luminance histogram is illustrated in FIG. 8C, an example right luminance histogram is illustrated in FIG. 8B, and an example left luminance histogram is illustrated in FIG. 8D.

To create the luminance histogram, the histogram module 86 maps the pixels of the luminance value image according to brightness. Each pixel may have a brightness level or number within the range of 0 to 255, with 0 being totally black and 255 being totally white.

Figure 9:
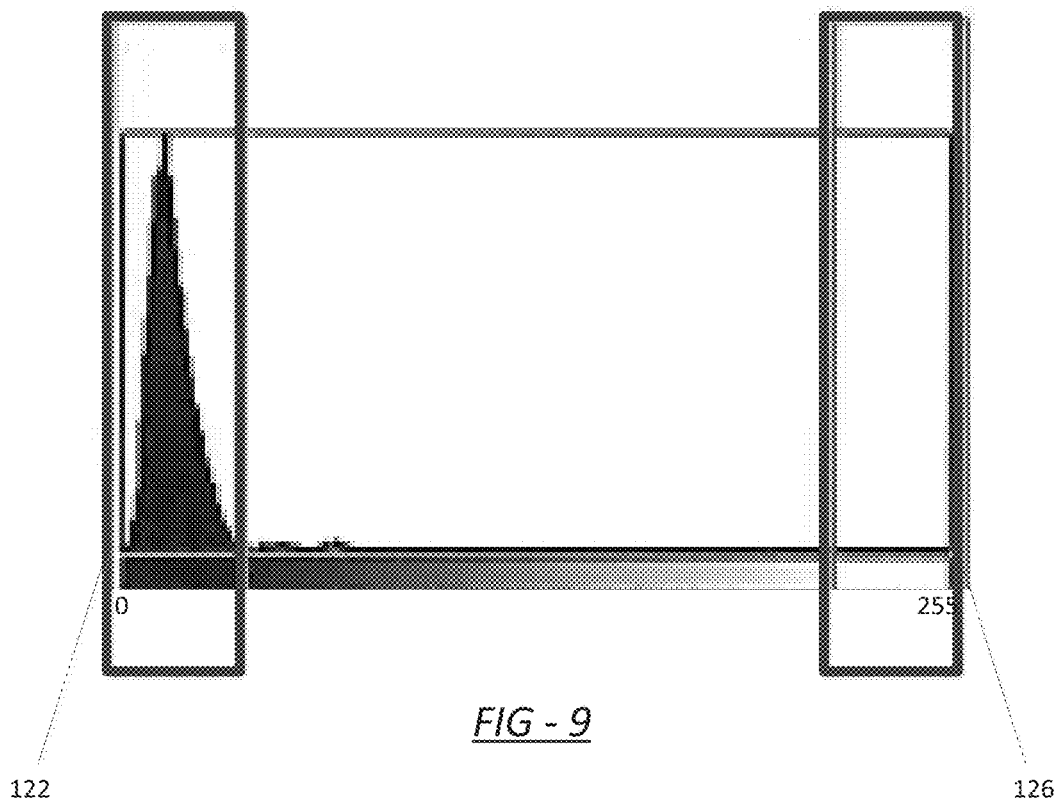
FIG. 9 illustrates another example luminance histogram according to the present teachings.

The histogram module 86 provides the front, rear, left and right histograms (FIGS. 8A-8D) to the likelihood module 90. The likelihood module 90 determines a blackout ratio and a whiteout ratio for each of the front, rear, left and right histograms. The blackout ratio is computed as the dark pixel count divided by the total pixel count, and the whiteout ratio is computed as the bright pixel count divided by the total pixel count. The dark pixel count is the number of pixels falling within a range of dark pixels on the histogram, and the bright pixel count is the number of pixels falling within a range of bright pixels on the histogram. With additional reference to FIG. 9, the dark pixel count may be the pixels falling within reference box 122, and the bright pixel count may be the pixels falling within reference box 126. For example only, the dark pixels may be within the range from 0 to 40 on the luminance histogram, and the bright pixels may be within the range from 250 to 255 on the luminance histogram. The likelihood module 90 then sums the blackout ratio with the whiteout ratio to obtain a Blackout+Whiteout Ratio.

Figure 10:
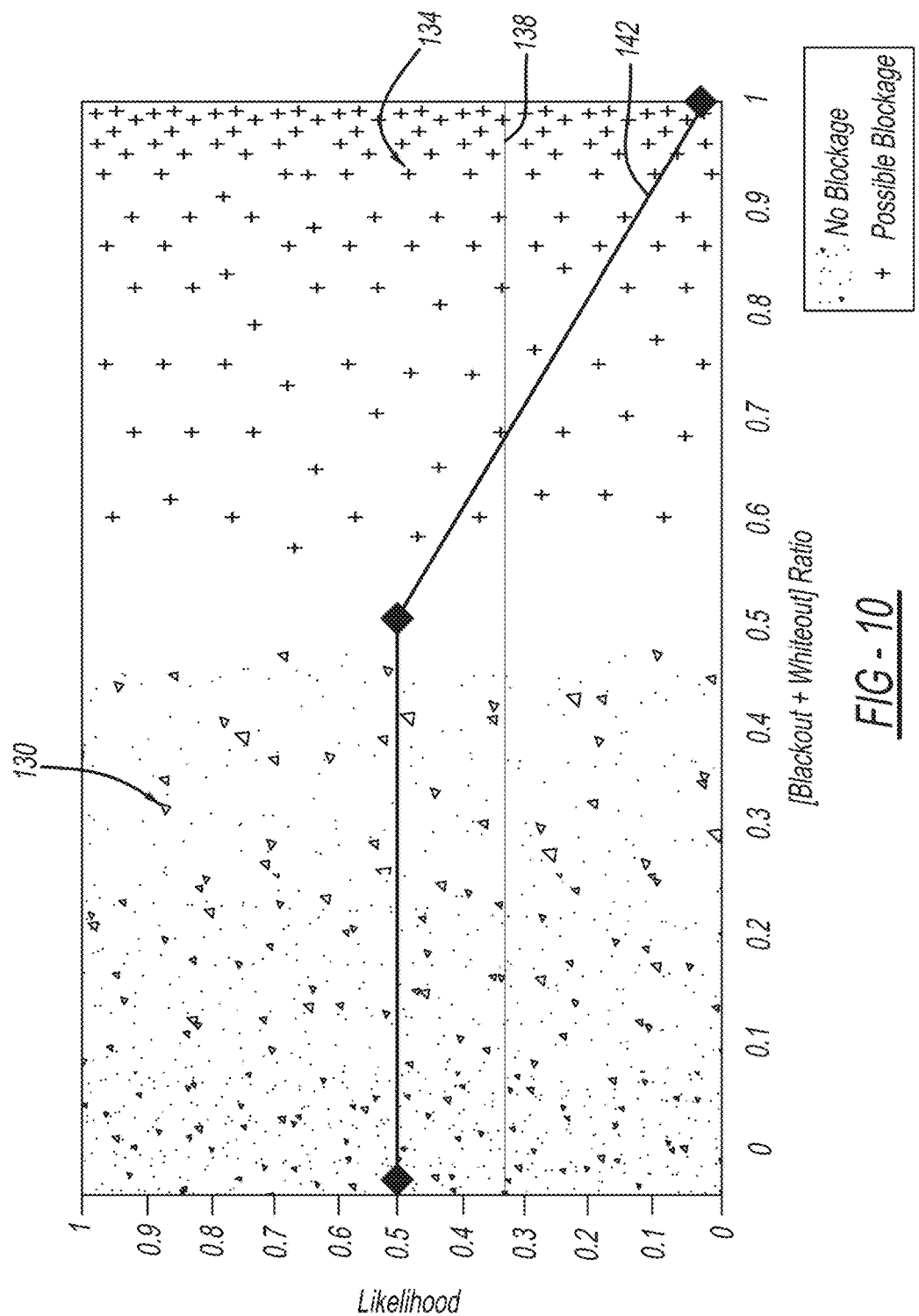
FIG. 10 illustrates an example luminance likelihood map according to the present teachings.

The likelihood module 90 further communicates with the storage module 102 to retrieve a luminance likelihood map (FIG. 10). The luminance likelihood map is a predetermined likelihood map having thresholds that indicate the probability of an image being blacked out or whiteout, and thus, the camera being blocked or degraded. If an image has a high percentage of blackout pixels, then the camera has a possibility of being blocked. In the luminance likelihood map, the area on the left of the map, from a Blackout+Whiteout Ratio of 0 to approximately 0.4, with a greater probability the closer the Blackout+Whiteout Ratio is to 0, is a "No Blockage" area, indicated at 130. The area on the right of the luminance likelihood map, from a Blackout+Whiteout Ratio of approximately 0.7 to 1, with a greater probability the closer the Blackout+Whiteout Ratio is to 1, is a "Possible Blockage" area, indicated at 134. Threshold line 138 extends horizontally across the luminance likelihood map at a threshold value of approximately 0.33, and the mapping line 142 extends horizontally across the luminance likelihood map at a value of 0.5 from a Blackout+Whiteout Ratio of 0 to 0.5 and then linearly decreases in likelihood from a Blackout+Whiteout Ratio of 0.5 to 1.

The likelihood module 90 determines the likelihood along mapping line 142 which corresponds to the calculated Blackout+Whiteout Ratio from the luminance histogram. If the likelihood and Blackout+Whiteout Ratio is within area 130, there is no blockage. If the likelihood and Blackout+Whiteout Ratio is within area 134, the likelihood module 90 determines that there may be possible blockage.

The likelihood module 90 communicates this information with the line alignment module 94. The line alignment module 94 also communicates with the image processing module 82 to obtain the overhead view images from each of the cameras 30. To avoid false blockage reporting during instances such as nighttime driving (due to a high ratio of black pixels that appear in the overhead view images during nighttime driving), the line alignment module 94 performs additional analysis to confirm the blockage status. The line alignment module 94 confirms an image's camera blockage by checking an alignment accuracy of detected lines in overlapped images. The line alignment module 94 evaluates the individual overhead view images and detects feature points for various features in the images. For example, the line alignment module 94 detects feature points for lane markers 74 in the individual overhead view images. The line alignment module 94 compares the detected feature points in the potential blackout or whiteout image with the detected feature points in adjacent camera images to determine if the detected feature points in the potential blackout or whiteout image have similar trajectories as the detected feature points in adjacent camera images. This comparison may be referred to as Line Alignment (LA).

Figure 11:
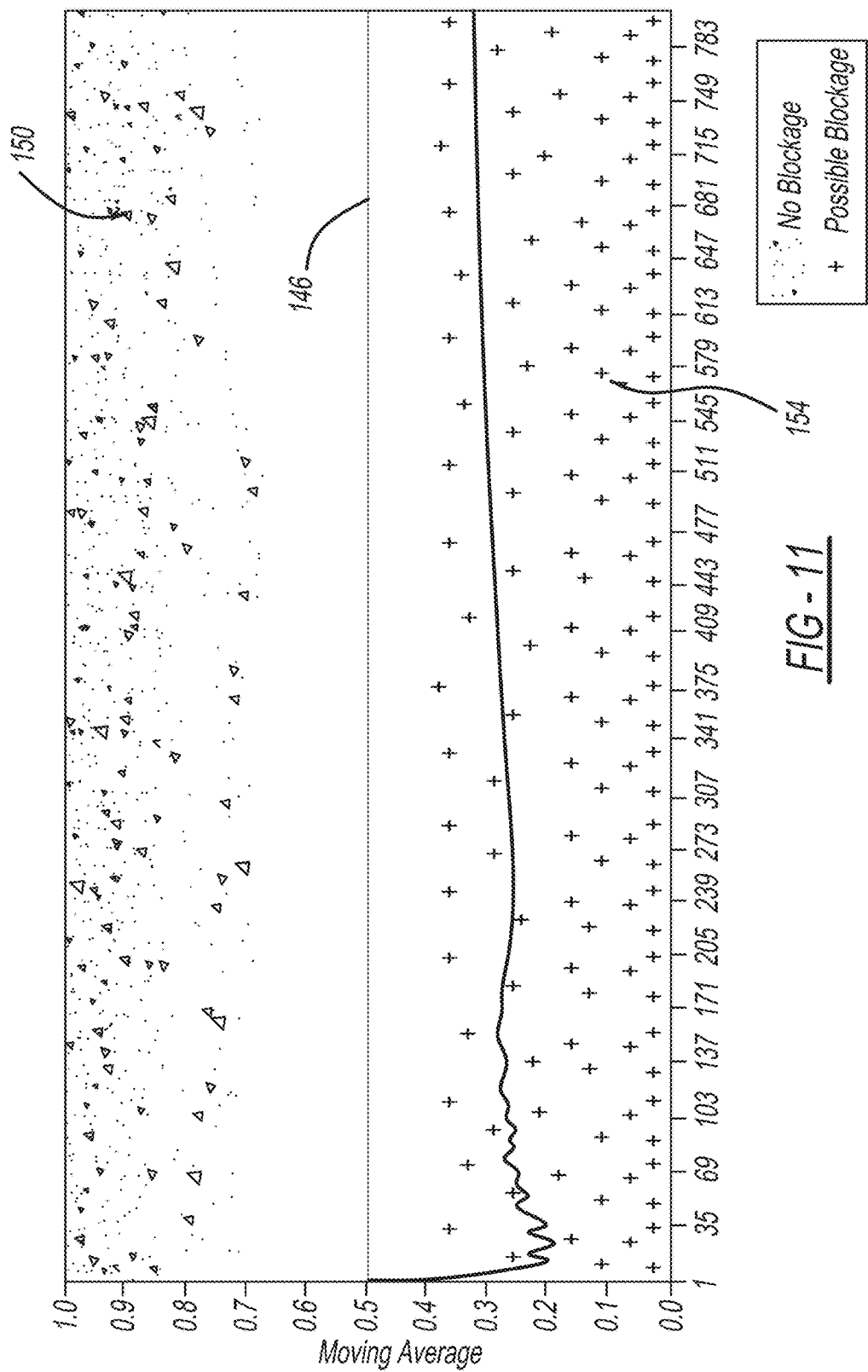
FIG. 11 illustrates an example moving average map according to the present teachings.

The line alignment module 94 also estimates the trend of alignment for the detected feature points in the potential blackout or whiteout image. The line alignment module 94 communicates with the storage module 102 to retrieve a moving average map. An example moving average map is illustrated in FIG. 11. The moving average map plots the moving average (y-axis) for each frame (x-axis). The cameras each record approximately ten frames per second. A threshold line 146 at a moving average of 0.5 divides a strong line alignment portion 150 of the moving average map from a weal line alignment portion 154.

The line alignment module 94 plots the error, or moving average, of the detected feature points in the potential blackout or whiteout image from the detected feature points in adjacent camera images on a moving average map. If the plotted line alignment value is greater than the threshold line 146, then there is strong line alignment indicating no blockage of the camera. If the plotted line alignment value is less than the threshold line 146, as shown in the example of FIG. 11, then there is weak line alignment indicating that the camera is obstructed, blocked, or degraded.

The line alignment module 94 reports whether the camera is blocked or degraded to the reporting module 98. The reporting module 98 makes a determination on whether to notify the lane sensing system 22, the driver alert system 18, or both. If none of the cameras 30 are blocked, the reporting module 98 may either report "no error" or "not blocked" for each camera. If one or more of the cameras 30 is blocked or degraded, the reporting module 98 may report "blocked" with the appropriate camera.

In some embodiments, the reporting module 98 reports whether the camera is obstructed, blocked, or degraded to the lane sensing system 22. If one or more of the cameras 30 is blocked, the lane sensing system 22 may stop detection and report an invalid or low confidence to the controller 26.

In some embodiments, the reporting module 98 reports a blocked camera to the driver alert system 18. The driver alert system 18 may activate an audible or visual alarm to alert the driver of the blocked camera.

The reporting module 98 may retain the results from the line alignment module 94 for a buffering period before reporting the results to the lane sensing system and/or the driver alert system 18. For example only, the buffering period may be approximately 50 frames or the number of frames equal to 100 meters of driving distance. Since the cameras store images at approximately 10 frames per second, the buffering time is approximately 5 seconds. Thus, while the default value from the reporting module 98 may be "no blockage," it may take at least 50 frames, or at least 5 seconds, to switched to a "blocked" state. The buffering time ensures that the camera is truly blocked and not temporarily or mistakenly blocked for a brief moment.

Figure 12:
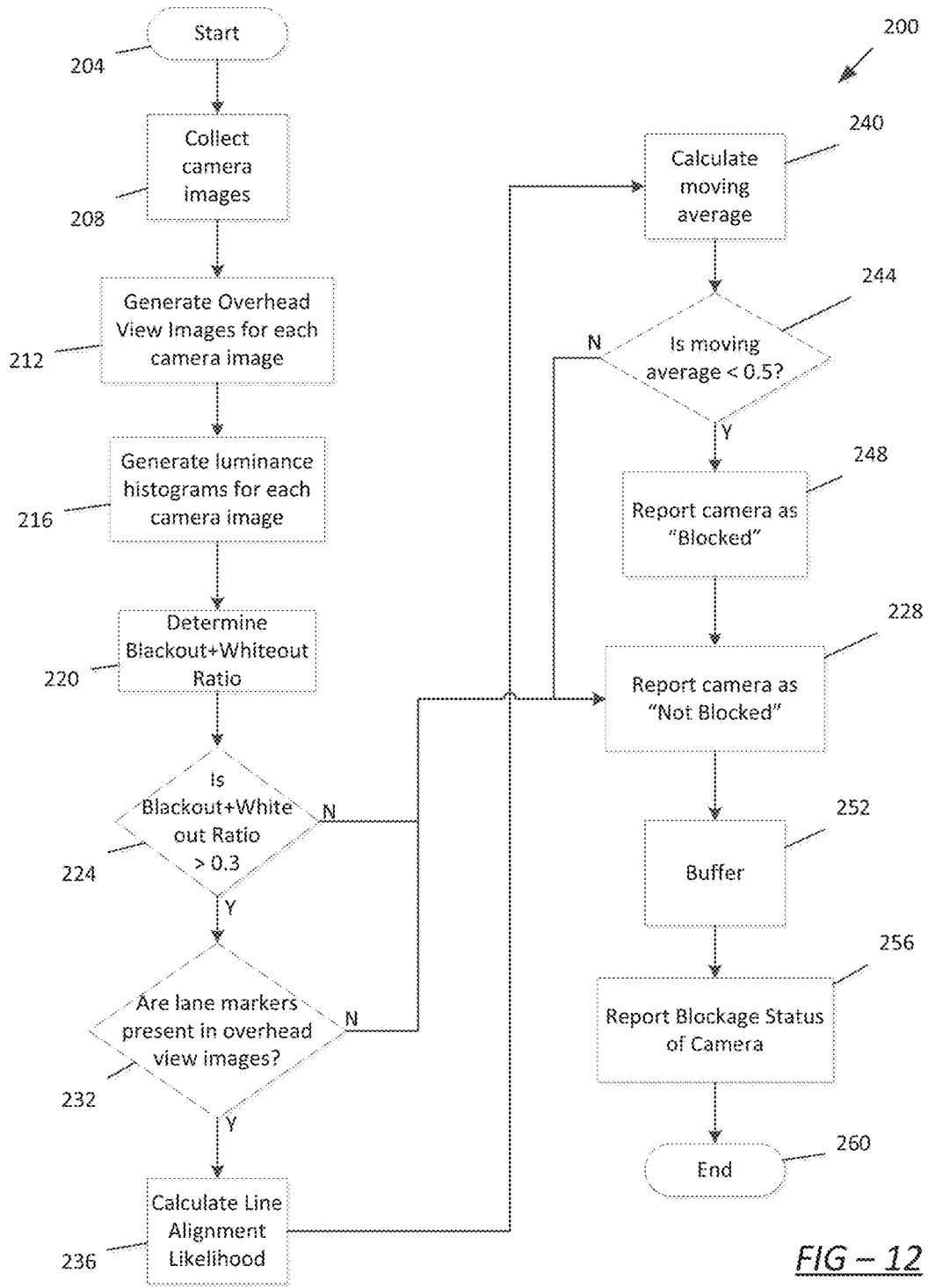
FIG. 12 illustrates a flow diagram for a method according to the present teachings for detecting blockages in a vehicle's surrounding view cameras.

Now referring to FIG. 12, a flow diagram for a method 200 of detecting blockages in a vehicle's surrounding view cameras is illustrated. Method 200 starts at 204. At 208 the cameras 30 take images of the surroundings of the vehicle 10. At 212, overhead view images of the camera images are generated. For example, the raw image from the front camera 30*a* is converted into a front overhead view image, the raw image from the rear camera 30*b* is converted into a rear overhead view image, the raw image from the left side camera 30*c* is converted into a left overhead view image, and the raw image from the right side camera 30*d* is converted into a right overhead view mage, At 216, a luminance histogram for each overhead view image is generated. In generating the luminance histogram, the pixels in each of the individual overhead view images are converted from color pixels into gray tone values computed based on a weighted average of the three colors, red, green, and blue, at that pixel, using the formula RGB Luminance Value=0.3R+0.59G+0.11B. As previously stated, while the weighted average of the red, green, and blue colors are 0.3, 0.59, and 0.11 in the recited equation, the red, green, and blue colors may be weighted differently as long as the sum of the weights is equal to 1.0. Thus, every RGB pixel computes to an 8-bit luminance value between 0 and 255, with 0 being totally black and 255 being totally white. The luminance histogram is then created by mapping the pixels of the luminance value image according to brightness.

At 220, the Blackout+Whiteout Ratio is computed. The blackout ratio is computed as the dark pixel count divided by the total pixel count, and the whiteout ratio is computed as the bright pixel count divided by the total pixel count. The dark pixel count is the number of pixels falling within a range of dark pixels on the histogram, and the bright pixel count is the number of pixels falling within a range of bright pixels on the histogram. As previously discussed, the dark pixel count may be the pixels falling within the range from 0 to 40 on the luminance histogram, and the bright pixel count may be the pixels falling within the range from 250 to 255 on the luminance histogram. The blackout ratio is then summed with the whiteout ratio to obtain a Blackout+Whiteout Ratio.

At 224, the Blackout+Whiteout Ratio is mapped on the luminance likelihood map. If the Blackout+Whiteout Ratio is less than 0.3, the likelihood falls within the "No Blockage" area 130 of the luminance likelihood map (FIG. 10), and the camera is reported as "Not Blocked" at 228. If the Blackout+Whiteout Ratio is greater than 0.3, the likelihood falls within the "Possible Blockage" area 134 of the luminance likelihood map (FIG. 10), and the method 200 moves to 232. In the present example, the Blackout+Whiteout Ratio is compared to a predetermined threshold of 0.3. Other predetermined thresholds greater than or less than 0.3 may alternatively be used. For example, the predetermined threshold may be set to 0.25 or 0.35, or another suitable predetermined threshold.

At 232, the overhead view images are evaluated to determine the presence of lane markers. If valid lane markers are not present in the overhead view images, the camera is reported as "Not Blocked" at 228. If there are no detected lane markers, then the line alignment module 94 cannot perform any additional analysis. The line alignment module 94 needs visible markers present to check the projection between two overlapped cameras using the visible markers' feature points. If valid lane markers are present in the overhead view images, method 200 proceeds to 236.

At 236, the alignment accuracy of detected lines in overlapped images is evaluated. During the evaluation, the individual overhead view images are scanned and feature points for various features in the images are detected within each individual overhead image. For example, the feature points for lane markers 74 in the individual overhead view images are detected. The detected feature points in the potential blackout or whiteout image are then compared with the detected feature points in adjacent camera images to determine if the detected feature points in the potential blackout or whiteout image have similar trajectories as the detected feature points in adjacent camera images. This comparison may be referred to as Line Alignment (LA).

At 240, the moving average is calculated. The error, or moving average, of the trajectory of the detected feature points in the potential blackout or whiteout image from the trajectory of the detected feature points in adjacent camera images are plotted on a moving average map (FIG. 11). The moving average for each frame, or image, is plotted on the same moving average map. If the plotted line alignment value is greater than the threshold line 146, then there is strong line alignment indicating no blockage of the camera, If the plotted line alignment value is less than the threshold line 146, as shown in the example of FIG. 11, then there is weak line alignment indicating that the camera is obstructed, blocked, or degraded.

At 244, the moving average is compared to the threshold value of 0.5. If the moving average is greater than or equal to 0.5, the camera is reported as "Not Blocked" at 228. If the moving average is less than 0.5, there is weak line alignment indicating that the camera is obstructed, blocked, or degraded, and the camera is reported as "Blocked" at 248, In the present example, the moving average is compared to a predetermined threshold of 0.5. Other predetermined thresholds greater than or less than 0.5 may alternatively be used. For example, the predetermined threshold may be set to 0.4 or 0.6, or another suitable predetermined threshold.

At 252, the "Blocked" and "Not Blocked" reporting status is buffered. The identified "Blocked" or "Not Blocked" results are retained for a buffering period before reporting the results at 256 to ensure that the camera is truly blocked (or not blocked) and not temporarily or mistakenly blocked (or not blocked) for a brief moment. For example only, the buffering period may be approximately 50 frames or the number of frames for 100 meters of driving distance. Since the cameras store images at approximately 10 frames per second, the buffering time may be approximately 5 seconds. However, the buffering time may also be dependent on driving speed over the 100 meters of driving distance. Thus, while the default value from the reporting module 98 may be "no blockage," it may take at least 50 frames, at least 100 meters, to switched to a "blocked" state.

At 256, the blockage status of the camera is reported. The blockage status may be reported to various systems of the vehicle utilizing the camera 30 images. For example, the blockage status may be reported to the lane sensing system 22. If one or more of the cameras 30 is blocked, the lane sensing system 22 may stop detection and report an invalid or low confidence to the controller 26. In some embodiments, if the blockage status is "Blocked," this status may be reported to the driver alert system 18. The driver alert system 18 may activate an audible or visual alarm to alert the driver of the blocked camera. The method 200 ends at 260.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The foregoing description of the embodiments has been provided for purposes of illustration and description, It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A camera monitoring system for a vehicle, the system comprising:
   a plurality of cameras disposed around an exterior of a vehicle;
   an image processing module communicating with the plurality of cameras and generating overhead view images from raw images taken by at least one of the plurality of cameras;

a histogram module communicating with the image processing module and generating at least one histogram from the overhead view images;

a likelihood module communicating with the histogram module, determining a blackout ratio and a whiteout ratio for the at least one histogram, and determining a likelihood of blockage for at least one of the plurality of cameras, the likelihood module summing the blackout ratio and the whiteout ratio to create a Blackout+Whiteout ratio and determining whether the Blackout+Whiteout ratio is greater than a first predetermined threshold, indicating a possible blockage of at least one of the plurality of cameras;

a line alignment module communicating with the likelihood module and the image processing module and detecting feature points in the overhead view image from a selected camera of the plurality of cameras and detecting the same feature points in the overhead image from an adjacent camera, determining trajectories for the feature points, and determining whether a trajectory of detected feature points in the overhead view image from the selected camera aligns with the trajectory of detected feature points in the overhead view image from the adjacent camera of the plurality of cameras; and a reporting module communicating with the line alignment module and reporting a camera blockage status to at least one vehicle system or controller.

2. The camera monitoring system of claim 1, wherein the plurality of cameras includes a front camera mounted on a front of the vehicle, a rear camera mounted on a back of the vehicle, a left side camera mounted on a left side of the vehicle, and a right side camera mounted on a right side of the vehicle.

3. The camera monitoring system of claim 1, wherein the histogram module converts a plurality of pixels of the raw images from color pixels into gray tone values representing a luminosity based on a weighted average of red, green, and blue colors in each pixel.

4. The camera monitoring system of claim 1, wherein the histogram module converts a plurality of pixels of the raw images into 8-bit luminance values, each luminance value being within a range of 0 and 255.

5. The camera monitoring system of claim 4, wherein the histogram module maps the luminance values to create a luminance histogram.

6. The camera monitoring system of claim 5, wherein the plurality of pixels in the luminance histogram are from a region of interest within at least one of the overhead view images.

7. The camera monitoring system of claim 1, wherein the blackout ratio is the total pixels within a range of 0 to 40 on the at least one histogram divided by the total pixel count, and the whiteout ratio is the total pixels within a range of 250 to 255 on the at least one histogram divided by the total pixel count.

8. The camera monitoring system of claim 1, wherein the first predetermined threshold is 0.3.

9. The camera monitoring system of claim 1, wherein the line alignment module determines a moving average of the trajectory of detected feature points in the selected camera of the plurality of cameras from the trajectory of detected feature points in the adjacent camera of the plurality of cameras and determines whether the moving average is less than a second predetermined threshold, indicating a blocked camera, wherein the moving average is a difference in the trajectory of detected feature points in the selected camera from the trajectory of detected feature points in the adjacent camera.

10. The camera monitoring system of claim 9, wherein the second predetermined threshold is 0.5.

11. The camera monitoring system of claim 1, wherein the reporting module retains the camera blockage status for a predetermined buffer period before reporting the camera blockage status to ensure the validity of results.

12. The camera monitoring system of claim 11, wherein the predetermined buffer period is at least 50 frames or at least 100 meters driving distance.

13. A method for detecting blockages in a vehicle's surrounding view cameras, the method comprising:

capturing, by a plurality of cameras disposed around an exterior of a vehicle, raw images of the vehicle's surroundings;

generating, by an image processing module, overhead view images from the raw images taken by at least one of the plurality of cameras;

generating, by a histogram module, at least one histogram from the overhead view images;

determining, by a likelihood module, a blackout ratio and a whiteout ratio for the at least one histogram;

summing, by the likelihood module, the blackout ratio and the whiteout ratio to create a Blackout+Whiteout ratio;

determining, by the likelihood module, whether the Blackout+Whiteout ratio is greater than a first predetermined threshold, indicating a possible blockage of at least one of the plurality of cameras determining, by the likelihood module, a likelihood of blockage for at least one of the plurality of cameras;

detecting, by a line alignment module, feature points in the overhead view image from a selected camera of the plurality of cameras and the same feature point in the overhead view image from an adjacent camera;

determining, by the line alignment module, trajectories for the feature points in the overhead view image from the selected camera and the overhead view image from the adjacent camera;

determining, by the line alignment module, whether the trajectory of detected feature points in the overhead view image from the selected camera of the plurality of cameras aligns with the trajectory of detected feature points in the overhead view image from the adjacent camera of the plurality of cameras; and reporting, by a reporting module, a camera blockage status to at least one vehicle system or controller.

14. The method of claim 13, further comprising converting a plurality of pixels of the raw images from color pixels into gray tone values representing a luminosity based on a weighted average of red, green, and blue colors in each pixel to generate the at least one histogram.

15. The method of claim 13, further comprising mapping a plurality of pixels from a region of interest within at least one of the overhead view images to generate the at least one histogram.

16. The method of claim 13, wherein the first predetermined threshold is 0.3.

17. The method of claim 13, further comprising:

determining a moving average of the trajectory of detected feature points in the selected camera of the plurality of cameras from the trajectory of detected feature points in the adjacent camera of the plurality of cameras, wherein the moving average is a difference in the trajectory of detected feature points in the selected camera from the trajectory of detected feature points in the adjacent camera; and determining whether the moving average is less than a second predetermined threshold, indicating a blocked camera, wherein the second predetermined threshold is 0.5.

18. The method of claim 13, further comprising retaining the camera blockage status for a predetermined buffer period before reporting the camera blockage status to ensure the validity of results, wherein the predetermined buffer period is at least 50 frames or at least 100 meters driving distance.

* * * * *

UNITED STATES PATENT AND TRADEMARK OFFICE
CERTIFICATE OF CORRECTION

PATENT NO. : 10,339,812 B2
APPLICATION NO. : 15/448287
DATED : July 2, 2019
INVENTOR(S) : Malok Alamir Tamer et al.

It is certified that error appears in the above-identified patent and that said Letters Patent is hereby corrected as shown below:

In the Claims

Column 16, Line 32: In Claim 13, after "cameras", insert --;--

Signed and Sealed this
Twenty-fifth Day of February, 2020

Andrei Iancu
*Director of the United States Patent and Trademark Office*